(12) United States Patent
Merlet

(10) Patent No.: US 8,233,692 B2
(45) Date of Patent: Jul. 31, 2012

(54) METHOD OF SUPPRESSING OBSCURING FEATURES IN AN IMAGE

(75) Inventor: Nicolas J. Merlet, Jerusalem (IL)

(73) Assignee: Siemens Computer Aided Diagnosis Ltd., Jerusalem (IL)

( * ) Notice: Subject to any disclaimer, the term of this patent is extended or adjusted under 35 U.S.C. 154(b) by 693 days.

(21) Appl. No.: 12/391,301

(22) Filed: Feb. 24, 2009

(65) Prior Publication Data

US 2009/0214099 A1 Aug. 27, 2009

Related U.S. Application Data

(60) Provisional application No. 61/031,783, filed on Feb. 27, 2008.

(51) Int. Cl.
*G06K 9/00* (2006.01)

(52) U.S. Cl. ......................................... 382/132; 382/275

(58) Field of Classification Search .................. 382/128, 382/131–132, 276, 275; 378/37
See application file for complete search history.

(56) References Cited

U.S. PATENT DOCUMENTS

| 2004/0165792 A1* | 8/2004 | Bamberger et al. ............ 382/305 |
| 2005/0111721 A1* | 5/2005 | Bamberger et al. ............ 382/132 |

FOREIGN PATENT DOCUMENTS

WO 0028466 A1 5/2000

OTHER PUBLICATIONS

Mausumi Acharyya, et al., "A Novel Method of Partitioning Regions in Lungs and Their Usage in Feature Extraction for Reducing False Positives", Medical Imaging 2008, Feb. 19-21, 2008, Proc. SPIE 6915, Seite 69150Z-1 bis 69150Z-7.
German Office Action dated Jun. 17, 2011 in Application No. 10 2009 010 607.3.

* cited by examiner

*Primary Examiner* — Duy M Dang
(74) *Attorney, Agent, or Firm* — Peter Withstandley

(57) ABSTRACT

A method of removing obscuring features of relatively standard size and shape from an image comprising the obscuring features, features of interest and background, comprising the steps of applying a geometric transformation to generate a transformed image with the obscuring features aligned with an axis of image; applying an attenuation algorithm to the transformed image to suppress features having a dimension in direction of axis of range appropriate to dimension of the obscuring features in similar alignment, and applying a reverse geometrical transformation to produce a modified image with obscuring features attenuated.

19 Claims, 12 Drawing Sheets

METHOD OF SUPPRESSING OBSCURING FEATURES IN AN IMAGE

CROSS REFERENCE TO RELATED UNITED STATES APPLICATIONS

This application claims priority from "Straightening The Ribs to Attenuate Them in Chest Images", Provisional Application No. 61/031,783 of Nicolas J. Merlet, filed Feb. 27, 2008, the contents of which are herein incorporated by reference in their entireties.

FIELD OF THE INVENTION

The present invention relates to methods of suppressing obscuring features in an image to enable viewing of features of interest. A particular application is for suppressing rib shadows in x-ray radiographs of the thoracic cavity for lung examination purposes, thereby enhancing and improving the detection of lesions.

BACKGROUND TO THE INVENTION

The chest x-ray is the most commonly performed diagnostic x-ray examination. In chest x-ray imaging, the heart, lungs, airway, blood vessels and the bones of the spine and chest are imaged in a painless medical test that helps in the diagnosis of medical conditions.

The chest x-ray is typically the first imaging test used to help diagnose causes of symptoms such as shortness of breath, fever, a bad or persistent cough, chest pain or injury. Its application helps in diagnosing and monitoring treatment for medical conditions such as pneumonia, lung cancer, emphysema, heart failure and other heart problems. It may be used to find fractures in ribs as well.

Pneumonia shows up on radiographs as patches and irregular whiter areas due to higher x-ray absorption from fluid in the lungs. If the bronchi, which are usually not visible, can be seen, a diagnosis of bronchial pneumonia may be made. Shifts or shadows in the region corresponding to the hila (the central mediastinal surfaces of the lungs where the lung roots enter) may indicate emphysema or a pulmonary abscess. Apparent widening of the spaces between ribs suggests emphysema. Chest x-ray examination may aid in the diagnosis of other pulmonary diseases.

Lung cancer usually shows up as some sort of abnormality on the chest radiograph. Hilar masses (enlargements at that part of the lungs where vessels and nerves enter) are one of the more common symptoms of lung cancer that may be shown in chest x-rays. Another common symptom is the indication of abnormal masses and fluid buildup on the outside surface of the lungs or surrounding areas. Interstitial lung disease, which is a term relating to a large category of disorders, many of which are related to exposure of substances such as asbestos fibers, for example, may be detected on a chest x-ray as fiber like deposits, often in the lower portions of the lungs.

One reason for conducting chest x-rays is to look for nodules or lesions, which are typically spherical regions of densification of the lung tissue that are often malignant and are indicative of cancer. The lungs themselves are situated within the rib cage. Because bones absorb x-rays to a larger extent than soft tissues, rib shadows appear as white stripes across the x-ray radiograph. Since the ribs curl around the body, the rib shadows as they appear on the x-ray radiograph, appear to cross each other. The cross-over points and the regions between the cross-over points appear as a pattern of almost parallelogram-like shapes. This pattern may disguise the shadows cast by nodules which may be aligned with the crossover points, with the spaces therebetween, with a single rib between the cross-over points and may overlap two or three of these regions. Thus the shadows cast by the ribs may disguise and conceal nodules.

In addition to the rib cage, the blood vessels within the lung have higher density than the air filled spongy lung tissue and absorb more x-rays, thereby causing them to cast a shadow, i.e. appear lighter on the radiograph. A blood vessel aligned head on to the direction of photography may cast a circular shadow and be mistaken for a nodule.

Absolute absorption varies with the period of exposure, the strength of the x-ray source and the size and shape of the patient. Details are resolved by identifying contrast discontinuities between regions, and computer aided diagnostic (CAD) programs have been developed to aid the process.

Whilst being x-rayed, patients are supposed to keep still and hold their breadth, thereby keeping lungs inflated. However, in practice patients may inadvertently move or inhale or exhale during the exposure to x-rays, blurring the resultant radiography images somewhat. Furthermore, since x-ray radiation may itself cause malignancies, radiologists are wary of repeatedly exposing patients to x-rays, particularly with pregnant women, the young, the elderly and/or the ill. Sometimes, it may be impossible to repeat tests once a problem is determined, as the patient may no longer be available.

Lung cancer may manifest itself as one or more malignant nodules which are typically near-spherical and may show up as near-circular whiter regions on the lung tissue. The size of a nodule may be smaller, similar or larger than the rib crossover, and thus isolation and identification of nodules is not easy.

It is, of course, imperative to detect all resolvable nodules. To avoid unnecessary anxiety and to reduce costs of unnecessary biopsies; it is desirable to minimize false positives as well.

The skilled radiographer may manually pick out nodules or lesions, but to speed up the diagnostic procedure, Computer Aided Diagnostic (CAD) techniques are increasingly used.

One approach used is segmentation, where the borders of features such as the lung lobe itself and ribs are identified. This is not always possible and indeed, is not always necessary.

What is required is to identify candidate regions of interest and to then decide if they are nodules or false positives. Once a nodule is identified, it is then necessary to determine if it is benign or malignant. This may require a biopsy, but a determination may sometimes be made by monitoring the nodule over time.

'False negatives' where actual nodules or tumors are not identified as such or discarded as 'noise' or some artifact of the system are unacceptable since late diagnosis may lead to complications and such mistakes may be fatal. The occurrence of 'false positives' where some other feature such as a rib crossing shadow is mistakenly identified as being attributed to a tumor, is less problematic but is still costly and may cause unnecessary anxiety to the patient so should also be minimized. Despite the importance, in practice the elimination of false positives whilst avoiding false negatives is difficult since tumors may have similar dimensions to the width of ribs or the diameter of blood vessels within the lung, and x-ray images typically have poor contrast. When scanning the lung region of x-ray images to look for regions of varying contrast or edges, a large number of candidate regions turn out to be rib crossings and the like.

There is a need to identify and eliminate rib shadows from chest x-rays and mammography images. Explicit rib segmentation is one approached that has been tried in the past and has met with some success however there is often an imprecision in defining the ribs and it will be appreciated that segmentation of the ribs as a precursor to suppression thereof is a computer intensive procedure that expends large amounts of processing power on defining and resolving features to be discarded which is a somewhat inefficient approach. Additionally, rib suppression based on segmentation which makes use of the varying contrast (grey levels) in the vicinity of the ribs, often results in distortions of the lung tissue which may introduce artifacts, i.e. noise from the processing. Such distortions may conceal elements of interest as well. Consequently, other methods of rib suppression are required and embodiments of the present invention address this need.

SUMMARY OF THE INVENTION

In a first aspect, embodiments of the present invention are directed to providing a method of removing obscuring features of relatively standard size and shape from an image comprising the obscuring features, features of interest and background, comprising:

(b) selecting Cartesian axes;

(c) applying a geometric transformation to generate a transformed image with the obscuring features substantially aligned with one of said axes of image;

(d) applying an attenuation algorithm to the transformed image to suppress features having a dimension in direction of one of said axes of range appropriate to dimension of the distracting features in same direction, and (e) applying a reverse geometrical transformation to produce a modified image with distracting features attenuated.

Typically, the method comprises a preliminary stage (a) of segmenting a region of interest.

In a preferred embodiment, the image is a medical image of a thoracic cavity and said obscuring features are rib depictions and said features or interest and background are lung tissue and malignancies, wherein step (c) comprises the steps of applying a geometric transformation to align the rib depictions with a horizontal axis of the medical image; step (d) comprises applying an attenuation algorithm to suppress the rib depictions, and step (e) comprises applying a reverse geometrical transformation, thereby generating a modified image wherein the rib depictions are suppressed.

In typical applications the image is a x-ray radiograph.

Typically the method comprises a preliminary stage (a) of segmenting contour of lung.

Optionally, step (c) of applying a geometrical transformation comprises a step (c1) of applying a coarse transformation.

Optionally, step (c) further comprises a subsequent step (c2) of applying a fine transformation.

In specific embodiments, step (c1) comprises the following substeps:

c(i) selecting a section of a first column of a base Image $I_0$ between two contour points;

c(ii) fitting a polynomial approximation to distance vs. grey level along the column;

c(iii) generating a difference profile by plotting the difference between the value of the grayscale profile and the value of the polynomial approximation to the grayscale profile for each pixel along the section of the column;

c(iv) smoothing the difference profile using a smoothing function c(v) repeating steps c(i) to c(iv) to produce a smoothed-difference-profile for a second column of the base Image $I_0$;

c(vi) correlating the smoothed-difference-profiles of the first and second columns by applying an affine transformation to the smoothed-difference-profile of the second column;

c(vii) repeating steps c(i) to c(iv) to produce a smoothed-difference-profile for a next column of the base Image $I_0$;

c(viii) correlating the smoothed difference profiles of the next and previous columns by applying an affine transformation to the smoothed-difference-profile of the next column so as to minimize the correlation-difference between the previous transformed smoothed-difference-profile and the next transformed smoothed-difference-profile, and c(ix) repeating until an extremity of the lung is reached.

Typically, the section of column in sub-step c(i) is distance between contour points minus a safety margin.

Usefully, the safety margin is vertically displaced by 5% from each contour point.

Optionally, the method comprises a limitation selected from the list including:

(I) the polynomial approximation of step c(iii) being a $5^{th}$ order polynomial;

(II) the smoothing function of step c(iv) being a sigmoid transformation;

(III) the affine transformation of step c(vi) comprising applying a linear transformation of type $x' \rightarrow ax+b$ where a defines a degree of stretch and b defines an offset, thereby minimizing correlation-difference between the first smoothed-difference-profile and the transformed second smoothed-difference-profile;

(IV) the first column is a median x coordinate of a lung and correlation is performed separately towards left and right sides of the lung.

(V) storing cumulative affine transform coefficients for each column for use in inverse geometric transform for converting the attenuated transformed image $I_5$ into a desired final image $I_f$, and (VI) reaching an extremity of a lung is defined as reaching point where column length does not exceed 100 pixels.

Typically, stage (d) of suppressing rib depictions comprises the following substeps:

d(i) identifying short horizontal elements having horizontal dimensions too short to correspond to ribs, and d(ii) discounting said short horizontal elements to identify suspect rib depictions by elimination.

Optionally, the method further comprises the step d(iii) of identifying suspect ribs as ribs by examination of vertical dimensions in transformed image.

Optionally, the method further comprises the substeps of removing suspected ribs from the second transformed image $I_2$ by plotting the grayscale of each column to form an irregular convex shaped profile, and enveloping the irregular convex shaped profile using a convexity transform.

Optionally, the step d(i) of identifying short horizontal elements comprises:

plotting grayscale against displacement for each row to generate an irregular convex shaped profile;

applying a convexity fit to envelope the irregular convex shaped profile with a hull, and producing a second transformed image $I_2$ by replacing the grayscale profiles of each row of $I_1$ with the associated approximate hull-envelope.

Optionally, the step of applying the convexity fit comprises the following steps:

(A) letting the coordinates of each point profile be (x, g) where x corresponds to horizontal-pixel number and g is grayscale value thereof;

(B) taking a first point of the Hull at the point $(x_1, g_1)$;

(C) selecting a second point $(x_2, g_2)$ within the next range of pixels where $[(g_{tg}-g_1)/(x_t-x_1)]$ is lowest, and (D) repeating steps alpha and beta for all subsequent points.

Typically, the range is 200 pixels.

In a second aspect, embodiments of the invention are directed to a computer program for computer aided diagnosis of lung disorders by analysis of a medical image of a thoracic cavity having rib depictions obscuring lung tissue and malignancies, by applying a geometric transformation to align rib depictions shown in the medical image with a horizontal axis; applying an attenuation algorithm to suppress the rib depictions and applying a reverse geometrical transformation, thereby generating a modified image wherein the rib depictions are suppressed.

In a third aspect, embodiments of the invention are directed to a computer comprising: a processor, data input means, at least one data storage memory, random access memory, a user interface comprising user selectable keys and a visual display unit, said computer configured to receive a medical image having Cartesian axes of a body section with bone and/or cartilage depictions that obscures organs and/or soft tissue, wherein the image processing comprises the following steps: (b) applying a geometric transformation to align the bone depictions with an axis of the medical image; (c) applying an attenuation algorithm to suppress the bone and/or cartilage depictions, and step (d) applying a reverse geometrical transformation, thereby generating a modified image of the body section wherein the bone and/or cartilage depictions are suppressed.

Typically, the medical image is selected from the list including: x-ray images of limbs, x-ray images of organs, anterior posterior x-ray images, posterior anterior x-ray images, left lateral x-ray images, right lateral x-ray images, decubitus view x-ray images, lordotic view x-rays, images, expiratory view x-ray images, oblique view x-ray images, NMR images and ultrasound images.

Definitions

Shadow—the term shadow as used herein relates to a lighter region as it appears in a regularly viewed radiograph, caused by increased x-ray absorption.

For convenience only, the term lungs as used herein relates to the pair of both right lung and left lung taken together, whereas the term lung relates to either the right lung or left lung.

The terms lesion and nodule are used interchangeably to relate to suspicious densifications within the lung that may be benign or malignant.

The term candidate or suspect as used herein relates to a suspected lesion or nodule.

The terms suppression and attenuation and variations thereof are used interchangeably unless it is clear from context that this is not the case.

BRIEF DESCRIPTION OF THE FIGURES

For a better understanding of the invention and to show how it may be carried into effect, reference will now be made, purely by way of example, to the accompanying Figures, wherewith it is stressed that the particulars shown are by way of example and for purposes of illustrative discussion of the preferred embodiments of the present invention only, and are presented in the cause of providing what is believed to be the most useful and readily understood description of the principles and conceptual aspects of the invention.

DESCRIPTION OF THE EMBODIMENTS

Chest images are mostly used to diagnose or monitor symptoms of disease and illnesses that manifest themselves by a densification of the soft tissues. The densification leads to a whiter area, confusingly referred to as a shadow, appearing in the x-ray radiograph as conventionally viewed. The lighter shadows of ribs in posterior anterior x-ray radiography images of the chest obscure the features of the soft tissue, particularly nodules in lung tissue, making them difficult to identify. Thus to examine the soft tissue, whether manually or by a Computer Aided Diagnosis CAD system, it is advantageous to suppress or attenuate the rib shadows appearing in x-ray images.

Specific embodiments of the present invention are directed to identifying ribs showing up in x-ray radiographs to enable their suppression, allowing nodules and other irregularities of interest to be detected. Of note, in preferred embodiments, the ribs are not segmented, and thus a calculation-intensive and thus costly exercise is avoided, making the diagnosis more efficient. Applications include training classifiers, improved CAD systems and faster more accurate diagnostics.

Essentially the method of the invention applies a geometrical transformation to rectify the x-ray image so that the rib shadows, which are diagonal curved bands, are oriented horizontally and vertically, parallel and perpendicular to the x, y pixel grid of the digital x-ray image. By applying horizontal and vertical morphological operations, the rib shadows may then be attenuated or suppressed. Once attenuated, application of the reverse geometrical transformation is used to restore the image of the thoracic cavity to its original shape with the rib shadows suppressed. In this manner, features obscured by the ribs are more easily identified. The actual attenuation methods are less important, but typically make use of the continuation properties of the rib shadows.

It is a feature of preferred embodiments that main operations are performed on grey levels, without precise binary segmentation of the rib shadows. This enables fast processing and increased throughput. Typically, since the geometric transformations required for the left lung and that for the right lung require rotation in opposite directions, each lung is processed separately with essentially the same method.

Figure 1:
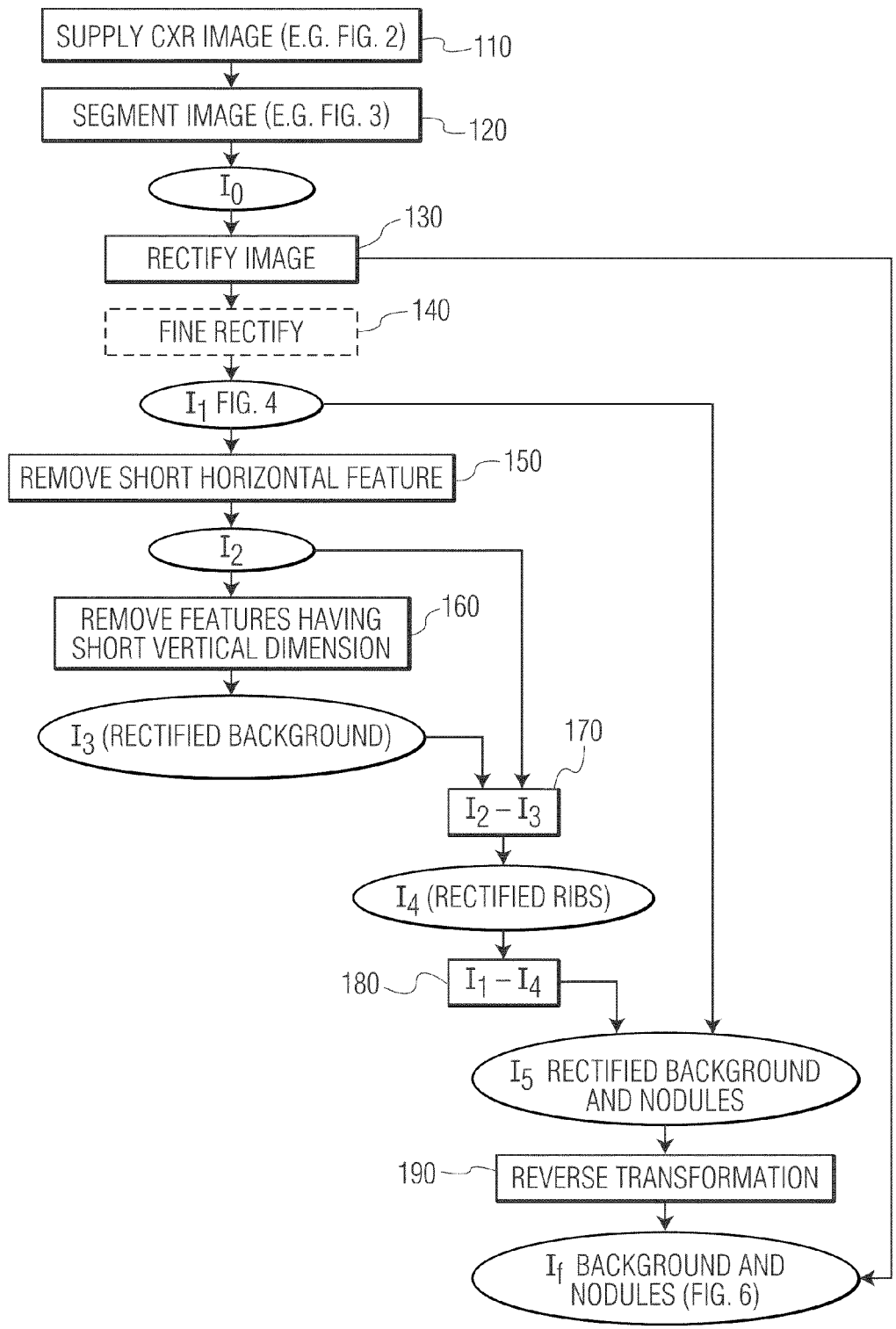
FIG. 1 is a flowchart summarizing the steps of a detailed method of suppressing rib shadows in a chest x-ray radiograph in accordance with a preferred embodiment of the invention.

With reference to FIG. 1, a detailed algorithm of the methodology embodied in one embodiment of the present invention consists of the following steps:

providing 110 an x-ray radiograph of the thoracic cavity. For purposes of discussion, the Figures and accompanying description relate to a digital posterior anterior radiograph in which both lungs are shown separately. It will be appreciated that with appropriate modification, the following algorithm may be applied to anterior posterior views, standard left lateral views, or the less common right lateral view, or other angles such as decubitus, lordotic view, expiratory views and oblique views.

Figure 2:
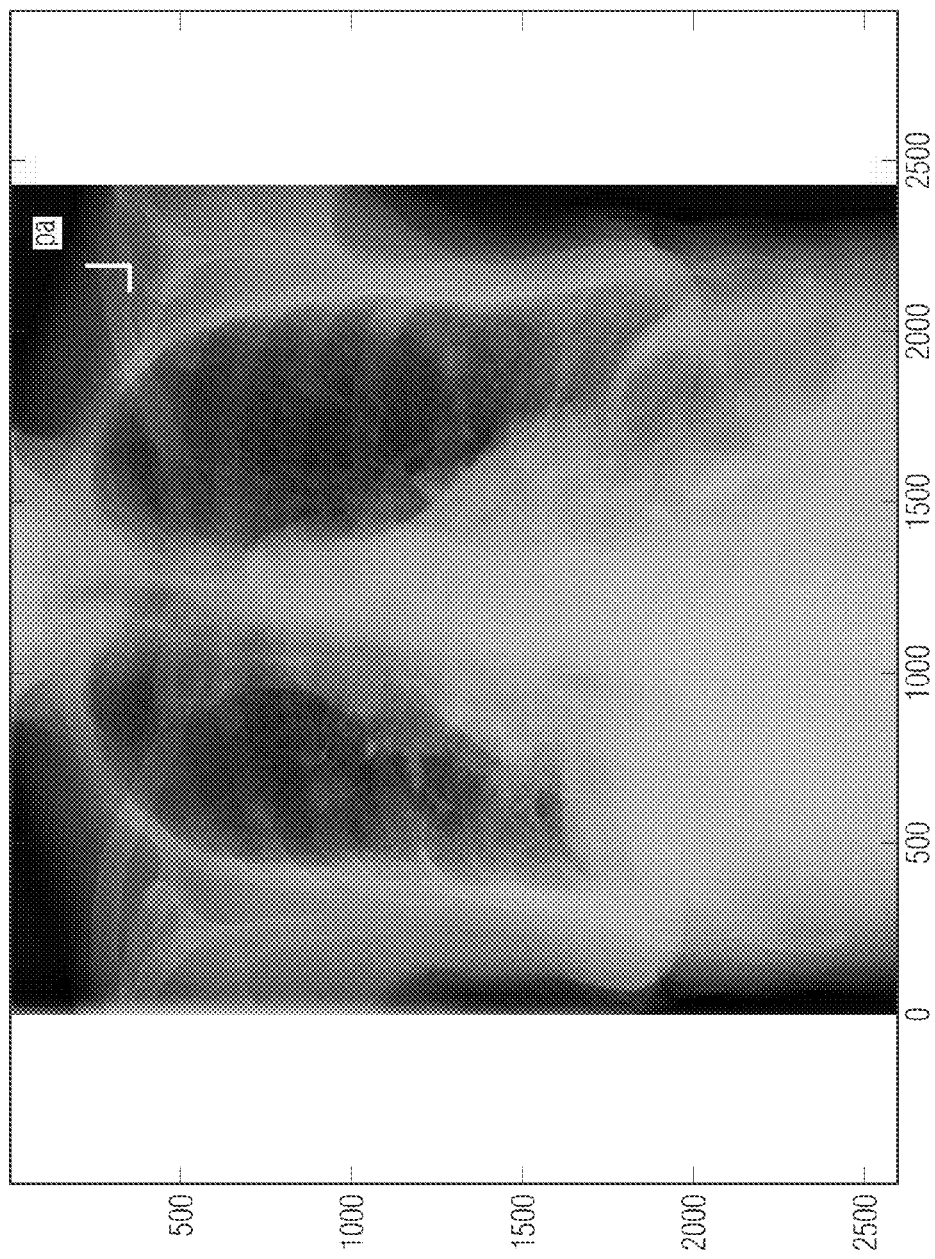
FIG. 2 is a typical anterior-posterior chest x-ray radiograph of a female.

This base Image $I_0$ is a digital grey scale image of the thoracic cavity and is typically a Dicom CXR image, but may be some other pixilated x-ray image of the thoracic cavity and could even be a digitized image based on a traditional continuous X-ray plate produced using halide emulsions that is then scanned and digitized or viewed via a CCD. A typical Dicom CXR digital posterior anterior x-ray radiograph of the thoracic cavity of a female is shown in FIG. 2. Although several cancerous lesions are indicated, the image demonstrates the problem of rib super-positioning making detection and characterization of suspected lesions within the image difficult.

Figure 3:
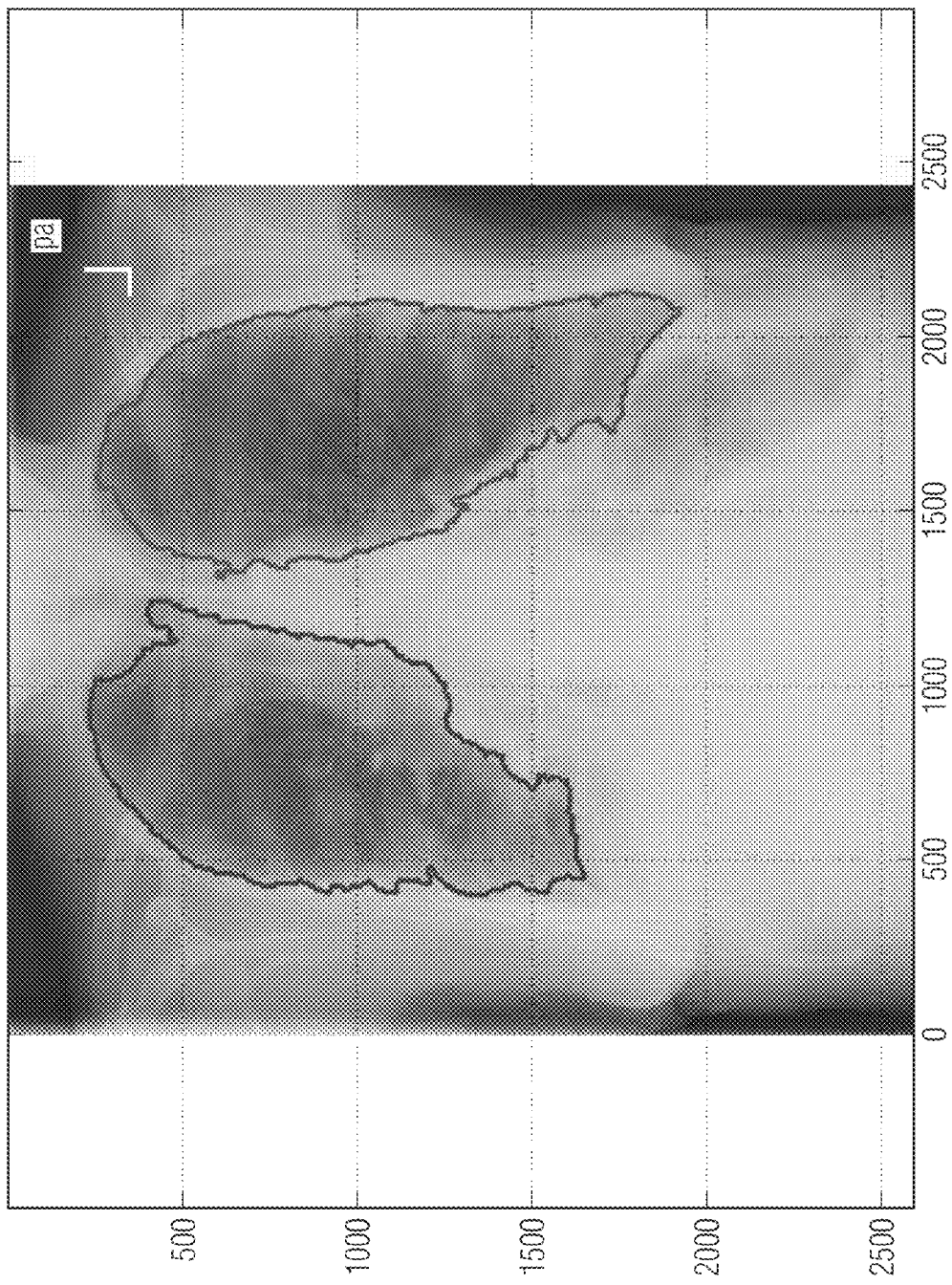
FIG. 3 shows the x-ray radiograph of FIG. 2 with lungs segmented.
Figure 4:
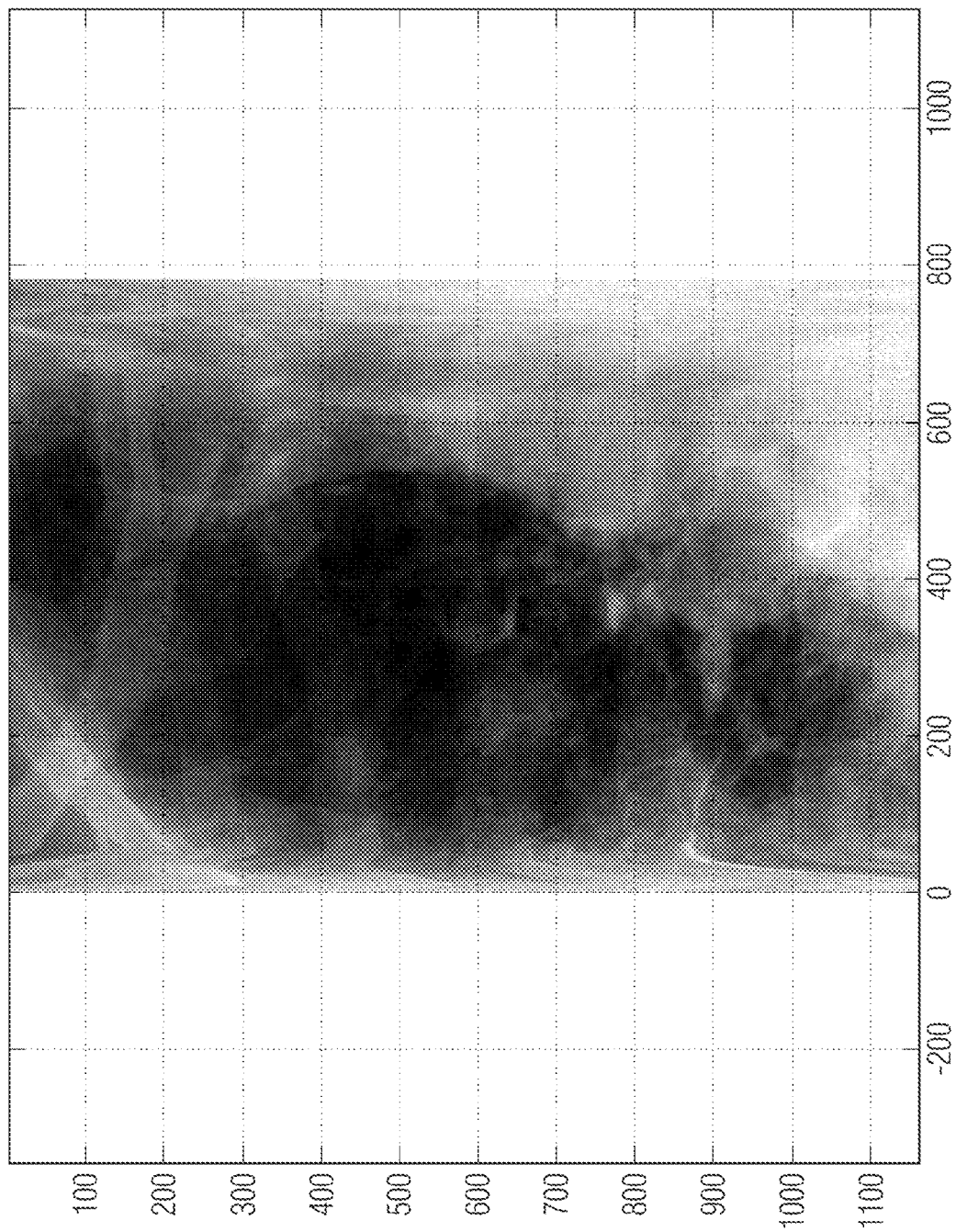
FIG. 4 shows the x-ray radiograph of FIG. 3, transformed to show the rib shadows horizontally.

The lung outline is then determined 120, typically using a contour extraction method. FIG. 3 shows is a reproduction of the typical digital posterior anterior x-ray radiograph of the thoracic cavity of a female shown in FIG. 2, with the lungs segmented. A rectification procedure is now applied to bring diagonal lines shown up in the image into alignment with the horizontal rows of pixels in the image. Optionally and preferably this could be achieved in a two stage process by applying a coarse rectification procedure 130, thereby producing a transformed image, followed by applying a fine rectification procedure 140 if necessary. The modified image resulting from the rectification (first transformed image $I_1$) is aligned horizontally. It includes the background, ribs and nodules. A transformed image of the left lung of FIG. 3 is shown in FIG. 4.

Since rib shadows are long, continuous structures, it is relatively easy to identify and remove or ignore short horizontal objects including lesions, and the next step is to remove 150 these objects, thereby producing a second transformed image $I_2$ that is rectified, consists of ribs and background but no nodules.

Figure 5:
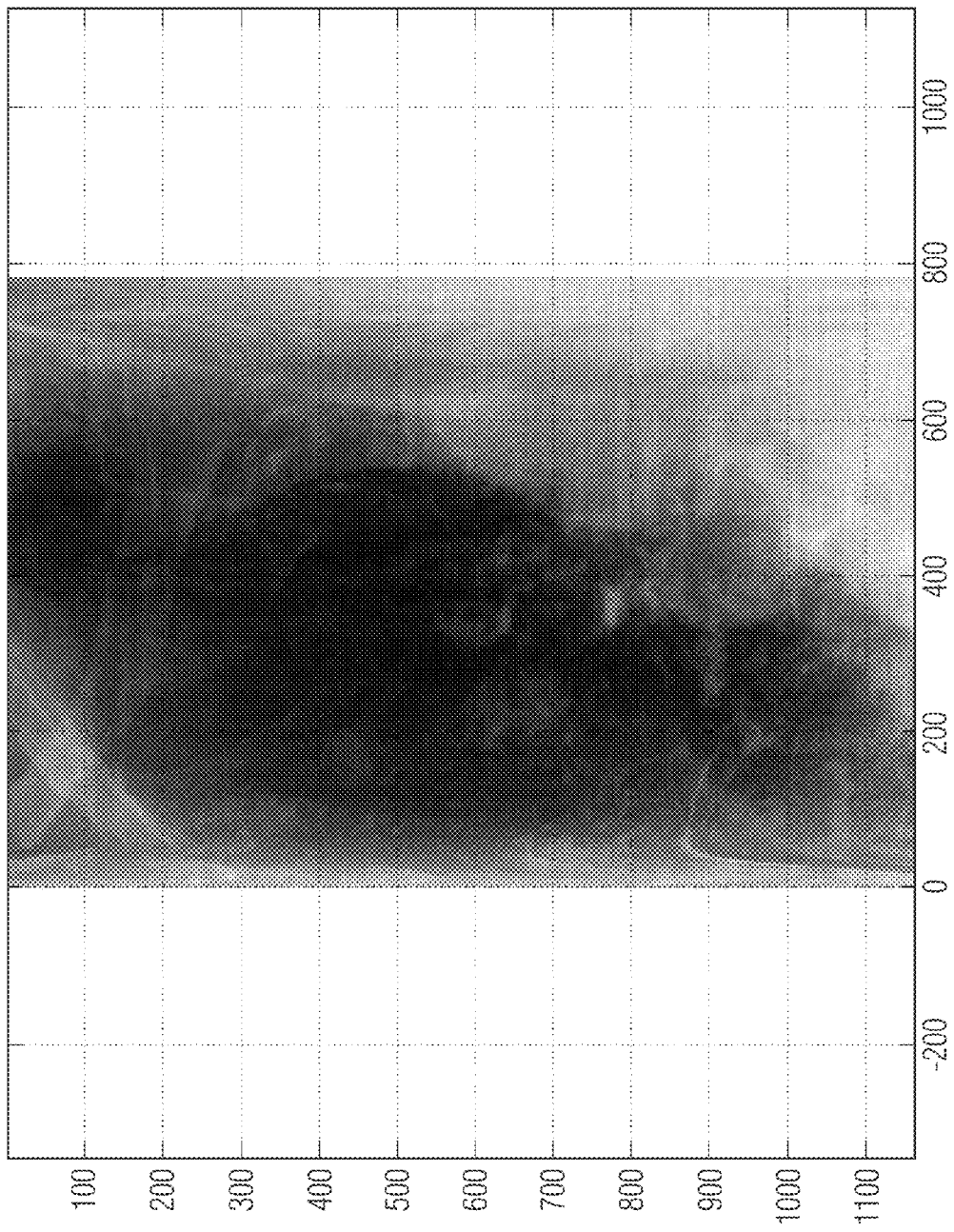
FIG. 5 shows the image of FIG. 4 with the rib shadows removed.
Figure 6:
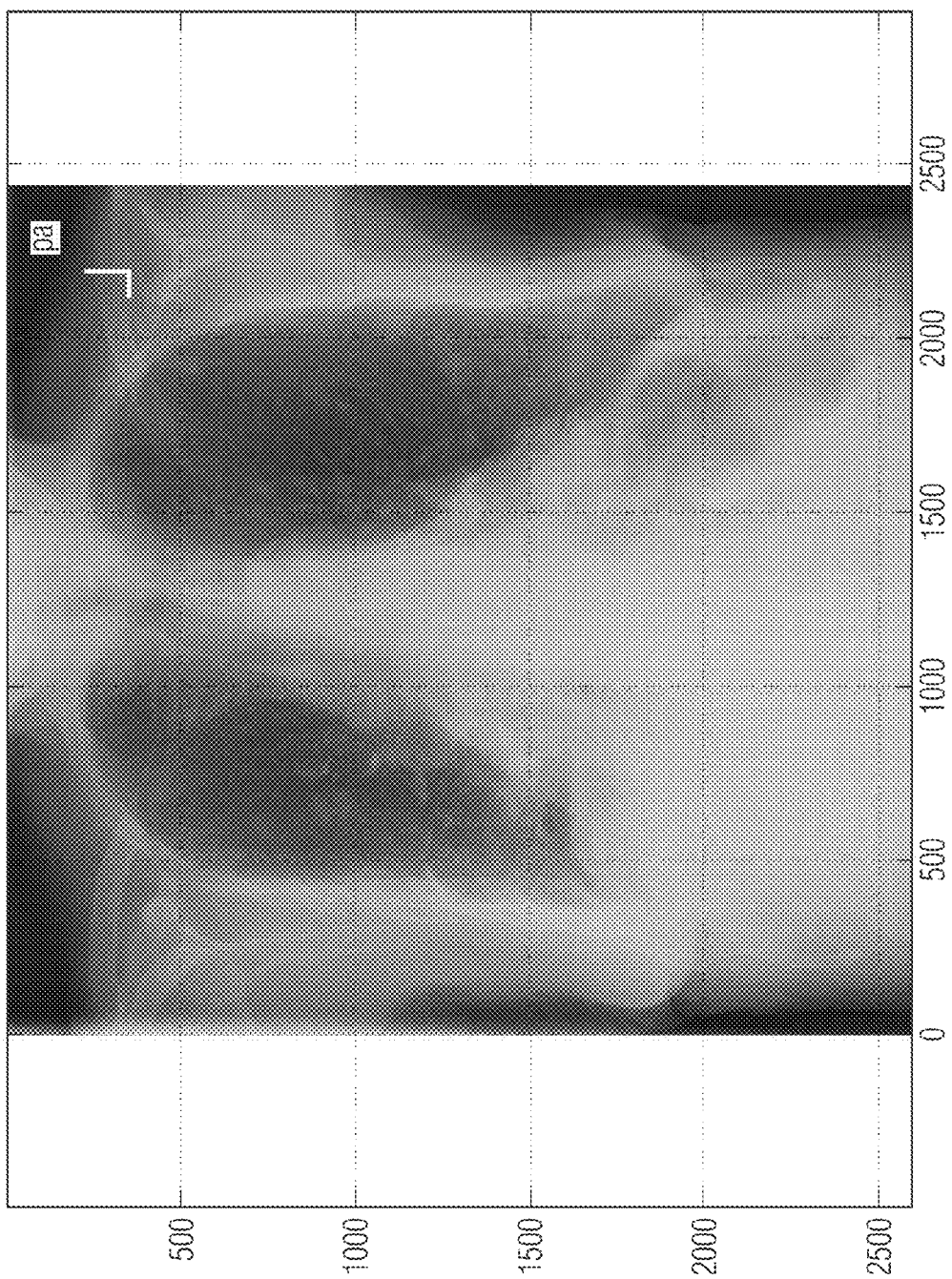
FIG. 6 shows the x-ray radiograph of FIG. 1 with the rib shadows removed, i.e. both lungs after the reverse transformation.

Next, vertically short objects (assumed to be ribs) of less than a threshold size are removed 160 from this image. This produces a third transformed image $I_3$ which is rectified and includes only the background. By comparing the image without ribs $I_2$ resulting from step 150 with the image $I_3$ from step 160 and comparing gray levels, an image consisting of ribs only ($I_2-I_3$) is generated 170. Now, by removing 180 the image ($I_2-I_3=I_4$) of ribs only from the image $I_1$ resulting from the coarse 130 and fine rectifications 140, a rectified image ($I_1-I_4=I_5$) showing background, small objects etc. but without ribs is generated (FIG. 5). By then applying 190 a reverse geometric transformation, that is the inverse function of the rectification function used for rectification 130, a modified digital image $I_f$ equivalent to starting image, i.e. a non-rectified image $I_f$ of the original digital posterior anterior x-ray radiograph $I_0$ including the background and the nodules is generated with the ribs suppressed (see FIG. 6).

Segmentation of the Lungs

Possible methods for segmenting the lung include looking for lung contour pixels using a line-by-line (row-by-row) approach. In such a method, a contour pixel is first searched by scanning a horizontal line across the middle of the image, starting from the background area toward the lung. From this first contour pixel, a similar process is conducted iteratively to further construct the lung contour on adjacent image lines. This is done independently for the upper and lower parts of the lung. Toward the upper and lower limits of the lung, in order to take into account the balloon shape of the lung, the scanning direction may be switched from horizontal lines (i.e. rows) to vertical ones (i.e. columns). During the scanning of a row or column, a contour pixel is identified by noting where a sufficient gradient of grey values is continuously observed along a minimal distance. Another method for segmentation of tissue in a digital image comprises the following steps: providing a digital image; smoothing the image and lowering its resolution; determining a contour point on the image; building upper contour and lower contour portions separately starting at the contour point and scaling and smoothing points on the contour portions to the resolution of the original image.

Another method relies on a global edge detection procedure based on local and global hull analysis. Yet another method uses statistical analysis of grey levels in a moving window of pixels thereby allowing for the selection of points on a provisional border of the lungs. Other methods include active contours or snakes, wave propagation methods, the Deriche gradient method and the Canno method. It will be appreciated that any or all of these methods and other known methods of the art may be combined. Furthermore, the skilled practitioner could segment the lung by manually drawing a contour there around, by hand and eye.

Rectification

Figure 7:
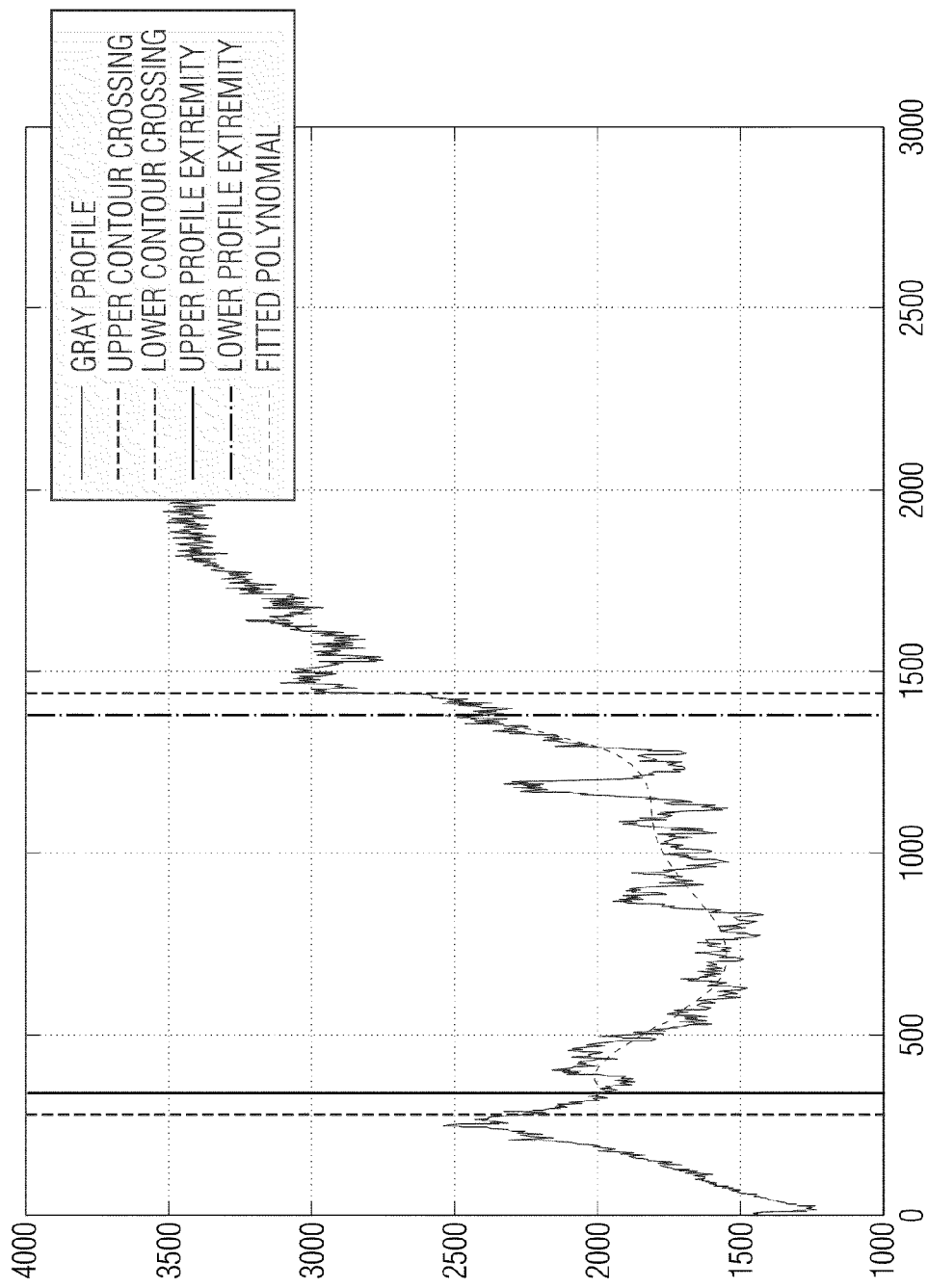
FIG. 7 is a displacement vs. intensity profile for the lung, showing external contours of lung (vertical dashed lines), effective contours, with 5% safety margins (vertical solid lines) and a $5^{th}$ order polynomial fit to the data.

The step of rectification of the image may be achieved by the following method:

(I) A section of a first column of the base Image $I_0$ is selected between two contour points. With reference to FIG. 7, the vertical dashed lines indicate the offset of the contour points. It will be appreciated that there is always some uncertainty regarding the edge of the lung and usefully extremes of the section are set to a safety margin from the extracted edge or contour, say 5% from each side. These positions are indicated by the solid vertical lines in FIG. 7. This truncation has been found not to adversely affect the results.

(II) A polynomial approximation is fit to the grey levels between these margins. Although even fitting a quadratic equation has been found to provide reasonable results it has been empirically determined that $5^{th}$ order polynomial approximations (i.e. of the type $y=ax^5+bx^4+cx^3+dx^2+ex+f$) appear to provide optimal results with little to be gained by using higher polynomials. The polynomial is used in place of the mean value of x in the correlation formula, to avoid a bias introduced by the background and is fit to the grayscale profile of the section of the first column of the base Image $I_0$. Other functions could be used to model the results. In FIG. 7, a fifth order polynomial is fit to the data.

(III) A difference profile is produced by plotting the difference between the value of the grayscale profile and the value of the polynomial approximation to the grayscale profile for each pixel along the section of the column.

(IV) The difference profile may be smoothed using some smoothing function such as a sigmoid transformation which is a known technique used to suppress extreme values which are typical of artifacts. One such transformation is $$NewVal = (1 - e^{\frac{-|OldVal|}{100}}) \frac{OldVal}{|OldVal|}.$$

Figure 8:
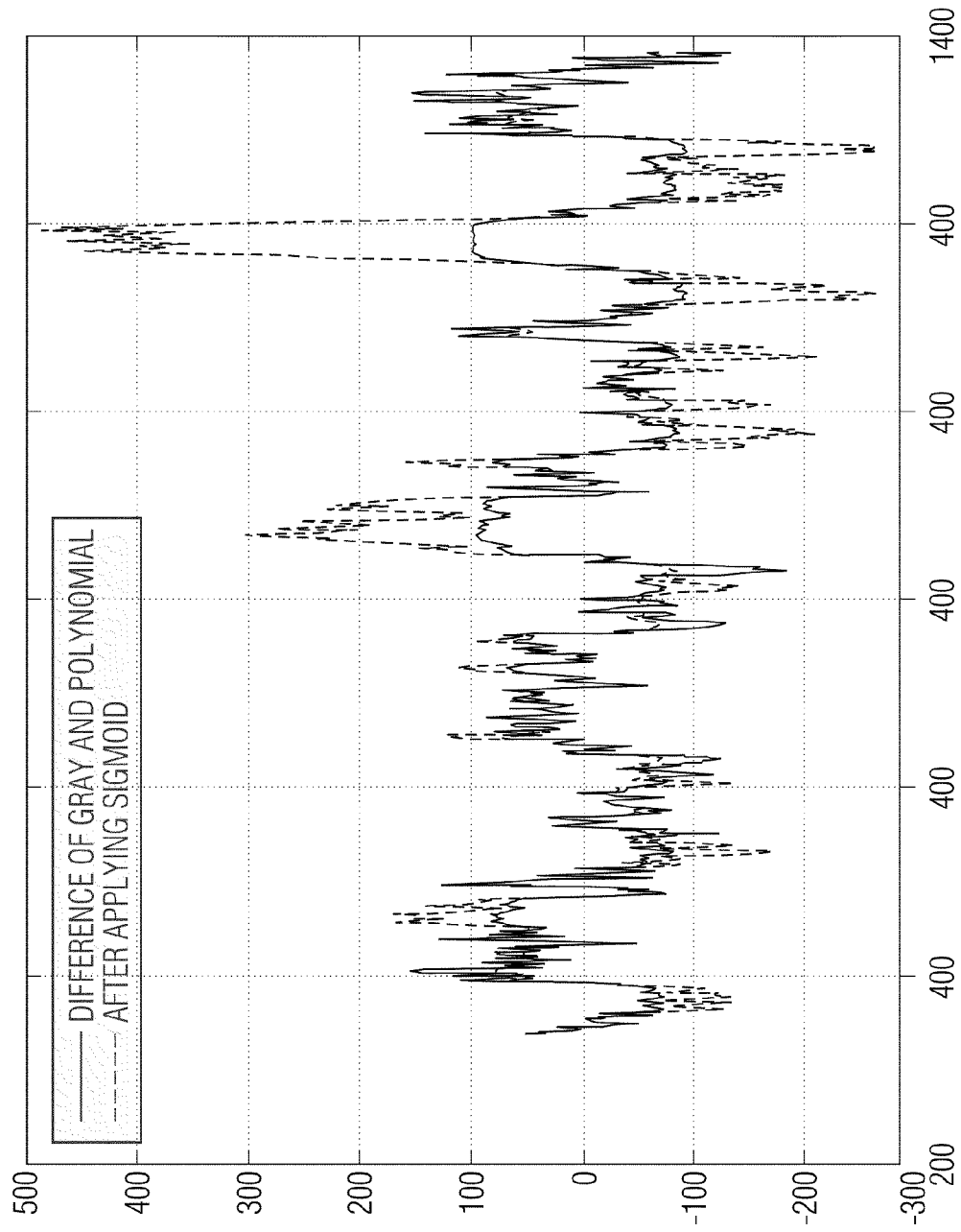
FIG. 8 shows the effect of applying a sigmoid to the fitted data, thereby smoothing out extreme values.

Other sigmoid transformations may be used. With reference to FIG. 8, the polynomial with a sigmoid smoothing function is shown. The sigmoid truncates extreme values, thereby smoothing out noise.

(V) Steps 1*a* to 1*d* are repeated to produce a smoothed-difference-profile for a second column of the base Image $I_0$. In a specific embodiment, the second column was 10 pixels away from the first column. It will be appreciated that other step intervals may be preferred with a general tradeoff between accuracy and processing time.

(VI) The smoothed-difference-profiles of the first and second columns are correlated by applying an affine transformation to the smoothed-difference-profile of the second column, i.e. a linear transformation of the type x'→ax+b where a defines the degree of stretch and b defines the offset, thereby minimizing the correlation-difference between the first smoothed-difference-profile and the transformed second smoothed-difference-profile.

Steps (I) to (IV) are repeated to produce a smoothed-difference-profile for a next column of the base Image $I_0$; again the next column may be 10 pixels away from the previous column.

(V) Once again, the smoothed difference profiles of the next and previous columns are correlated by applying an affine transformation to the smoothed-difference-profile of the next column so as to minimize the correlation-difference between the previous transformed smoothed-difference-profile and the next transformed smoothed-difference-profile.

(VI) The above steps are repeated until there are less than 100 pixels in the next section of the column to be correlated, indicating that the extremity of the lung has been reached.

Preferably, the first column to be processed during rectification is the median x coordinate (i.e. the middle) of the lung, and correlation is performed separately towards the left and right sides of the lung. It will be noted that the left and right lungs are treated separately and left and right sides refer to the sides of the left lung and of the right lung.

In a specific embodiment, the optimal affine transform coefficients for a given column are determined by first calculating the correlation-difference for each stretch coefficient a of from 0.8 to 1.2 in steps of 0.02, as well as for offset values b from −40 to +40 in steps of 4 pixels. When a minimum is found, the stretch coefficient a is fine-adjusted in steps of 0.01 from −0.04 to +0.04, and the offset values b are fine-adjusted in steps of 1 pixel from −8 to +8. Correlation-differences are calculated for values of a, using steps of 0.01 until a new minimum is found. In some embodiments only half the grey values are used thereby speeding the calculation. The optimal affine transform coefficients for intermediate columns which are not directly correlated may be interpolated.

Completing the correlation generates a rectangular rectified image $I_1$, in which the ribs are rendered approximately horizontal.

Preferably, the cumulative affine transform coefficients for each column are stored so as to be used at the end of the process to generate an inverse geometric transform for converting the rectified image $I_S$ into the desired final image $I_f$.

It will be appreciated that the lungs themselves are balloon shaped structures of low x-ray absorption. The closer one gets to the edge of the lung shadow, the lighter the image, and the nearer one is to the center of the lung shadow, the darker the image. Plotting grayscale against horizontal or vertical displacement across the lung shadow produces a generally convex, hull-like shape, which is essentially the background shadow generated by the lung and chest. Ribs, lesions and the like, result in additional shadows superimposed on this background.

Figure 9:
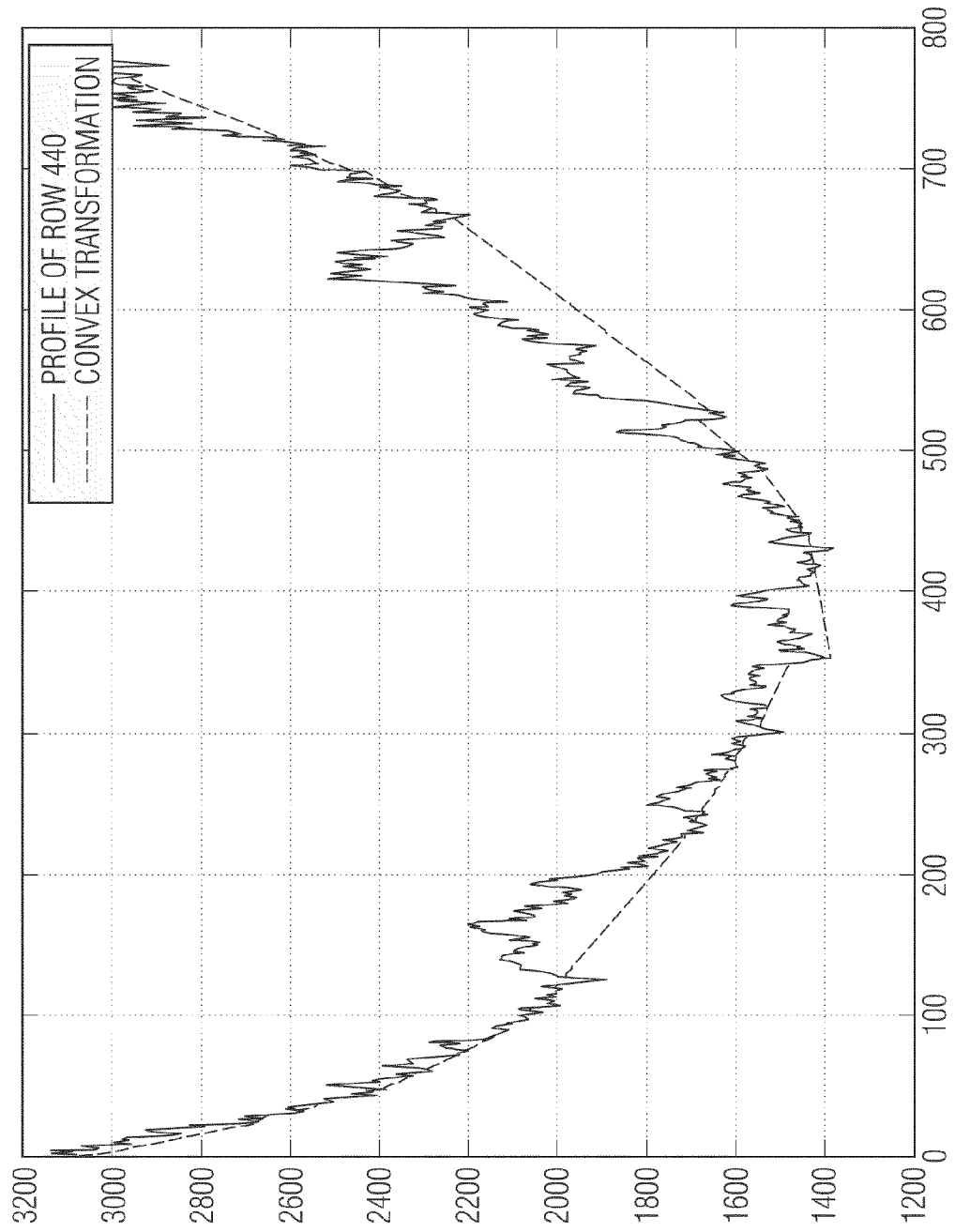
FIG. 9 is a horizontal profile along a row of pixels across a lung showing a hull shape fitted thereto.
Figure 10:
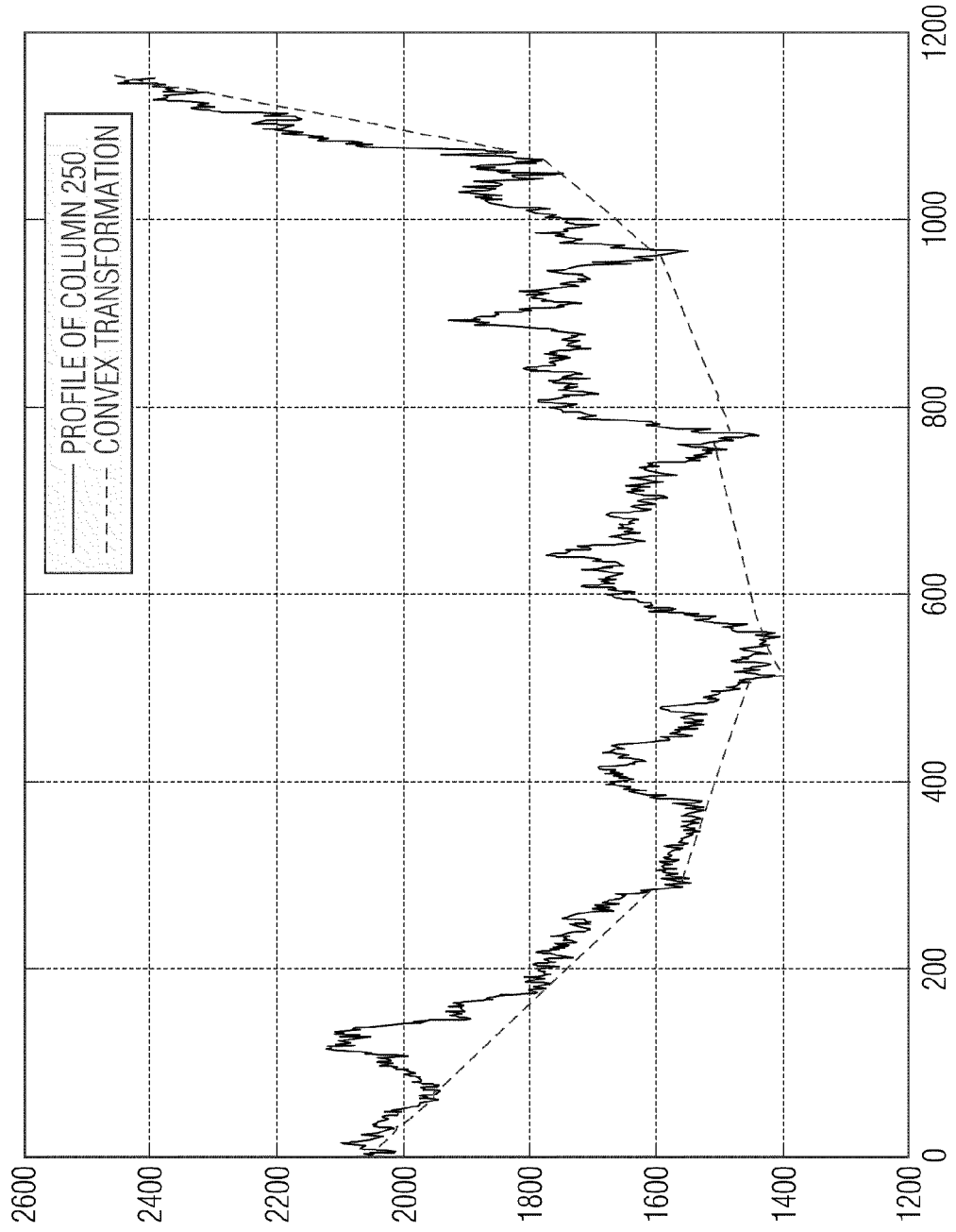
FIG. 10 is a vertical profile along a row of pixels across a lung showing a hull shape fitted thereto.

FIG. 9 is a grayscale vs. displacement profile along a row of pixels across the lung, shows such a hull shape. Similarly, FIG. 10 shows grayscale with displacement along a column, showing a similar hull shape formed by plotting grayscale vs. displacement in vertical direction. FIGS. 9 and 10 relate to the rectified image but the same general shape will be formed by plotting grayscale against displacement for sections across non-rectified lung shadows as well. It is, however, a feature of embodiments of the invention that the profiles are not correlated directly but rather a transformation thereof is correlated.

Fine Rectification

Fine rectification may include applying various smoothing functions. It will be noted that experimentally, good results have been obtained using the coarse rectification stage without subsequently applying a fine rectification stage.

The method of removing small lesions leaving ribs is now described based on horizontal scanning. This is followed by method of removing ribs based on vertical scanning.

Removal of Horizontal Features

It will be remembered that the aim of embodiments detailed herein is to suppress ribs, leaving other details. As a preliminary step, horizontal elements that are smaller than ribs are identified and removed from the first transformed image $I_1$ to be replaced once ribs are suppressed. Thus lesions and other features which are much smaller than ribs may be removed by the following steps:

2a. For each row, the grayscale against displacement is plotted. For reasons discussed above, the plot assumes an irregular convex shaped profile.

2b. A hull that envelopes the irregular convex shaped profile is approximated using a convexity fit.

2c. One convexity fit may be performed as follows:
  i. Let the coordinates of each point profile be (x, g) where x is the x-pixel number and g is the grayscale value;
  ii. The first point of the Hull is set to the point $(x_1, g_1)$;
  iii. The second point $(x_2, g_2)$ is selected as the point within the next 200 pixels where the slope from $(x_1, g_1)$ to $(x_2, g_2)$ is steepest. This may be determined mathematically by calculating the gradient-value of $(g_i-g_1)/(x_i-x_1)$ for all points $(x_i, g_i)$ where $(x_i-x_1)<200$
  and selecting the point with the lowest gradient-value $(g_i-g_1)/(x_i-x_1)$.

iv. Steps ii and iii may be repeated to determine all subsequent points.

2d. The second transformed image $I_2$ is produced by replacing the grayscale profiles of each row of $I_1$ with the associated approximate hull-envelope.

It will be appreciated that the method essentially consists of fitting tangents around the curve such that the length of the projection of each tangent onto the horizontal axis is 200 pixels. It will further be appreciated that the distance 200 pixels is chosen for convenience, since this is the size of determinable lesions at the resolution of the specific system used. For other systems, the optimum distance between points will be different lengths.

Removal of Vertical Features

The ribs may be removed from the second transformed image $I_2$ by applying a similar method to that described above however this time, in the vertical orientation, using the following steps:

3a. The grayscale of each column is plotted to form an irregular convex shaped profile.

3b. A hull enveloping the irregular convex shaped profile is approximated using a convexity transform.

3c. A preferred convexity transform may be performed as follows:
  i. Let the coordinates of each point profile be (y, g) where y is the x-pixel number and g is the grayscale value.
  ii. The first point of the Hull is taken at the point $(y_1, g_1)$.
  iii. The second point $(y_2, g_2)$ is selected as the point within the next 200 pixels where the slope from $(y_1, g_1)$ to $(y_2, g_2)$ is steepest. This may be determined mathematically by calculating the gradient-value of $$(g_i-g_1)/(y_i-y_1) \text{ for all points } (y_i, g_i) \text{ where } (x_i-x_1)<200$$
and selecting the point with the lowest gradient-value $(g_i-g_1)/(y_i-y_1)$.

iv. Steps ii and iii may be repeated to determine all subsequent points.

3d. The second transformed image $I_2$ is produced by replacing the grayscale profiles of each row of $I_1$ with the associated approximate hull-envelope.

The (rough) transformed image of the lung, with horizontal ribs is shown in FIG. 9.

Experimental Validation

Digital X-ray radiographs for 28 patients (26 malignant and 2 normal) were examined by computer aided diagnostic (CAD) software using lesion detection algorithms, with and without using the above algorithm to suppress the rib shadows. In both cases, true malignancies were detected. However, the suppression algorithm reduced the pre-classification number of candidate lesions detected by 20% and the number of post-classification false positives by 30%. Thus the efficacy of rib suppression by the above described technique was demonstrated. Furthermore it will be noted that the CAD software used for this validation was trained on standard images without rib suppression and applied without retraining. It is anticipated that retraining the software on rib suppressed images will result in further improvements.

Figure 11I:
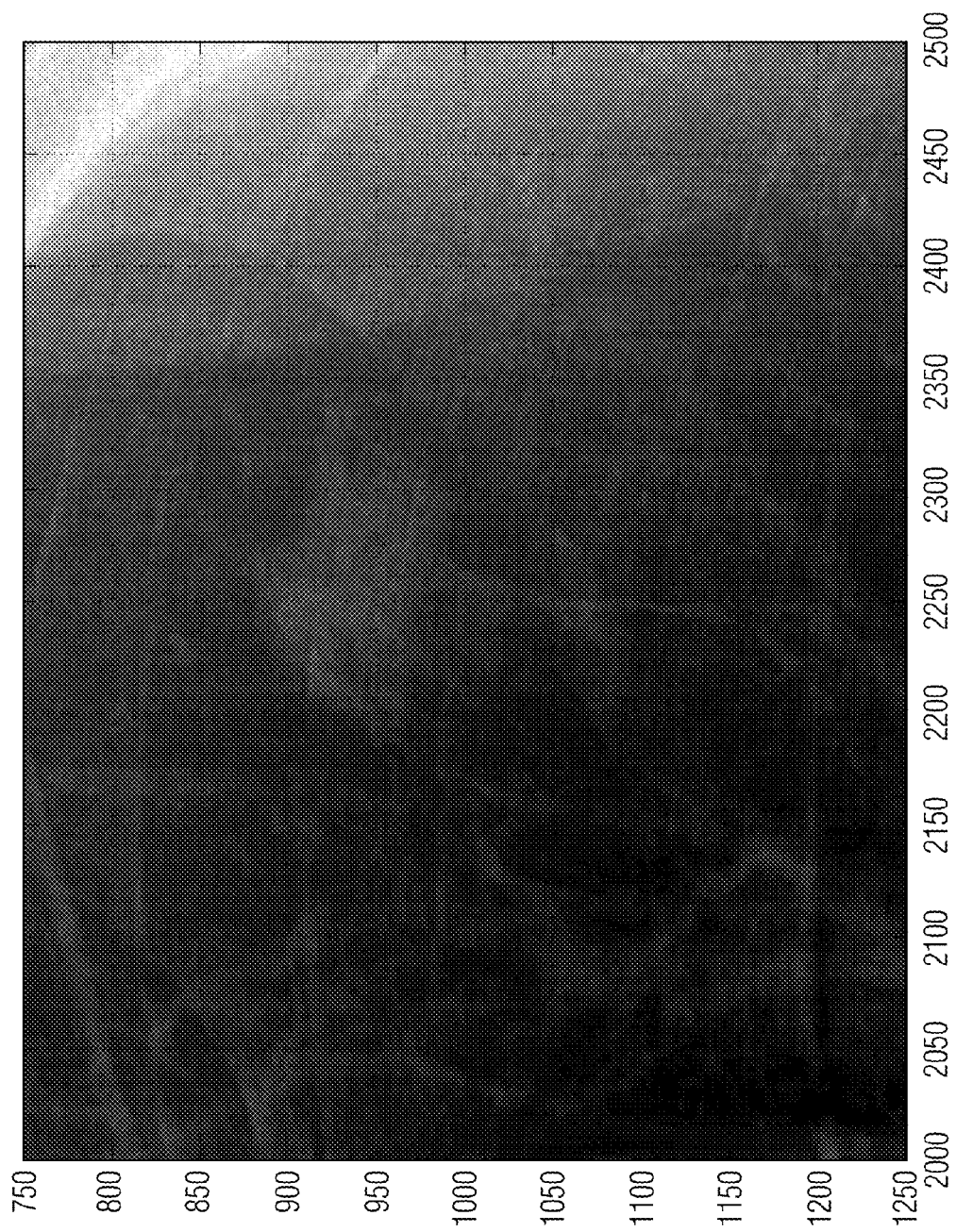
FIG. 11(i) is a close up radiograph of a lesion partially concealed by ribs, and FIG. 11(ii) shows the radiograph of FIG. 11(i) with ribs suppressed thereby making lesion easier to discern.
Figure 11:
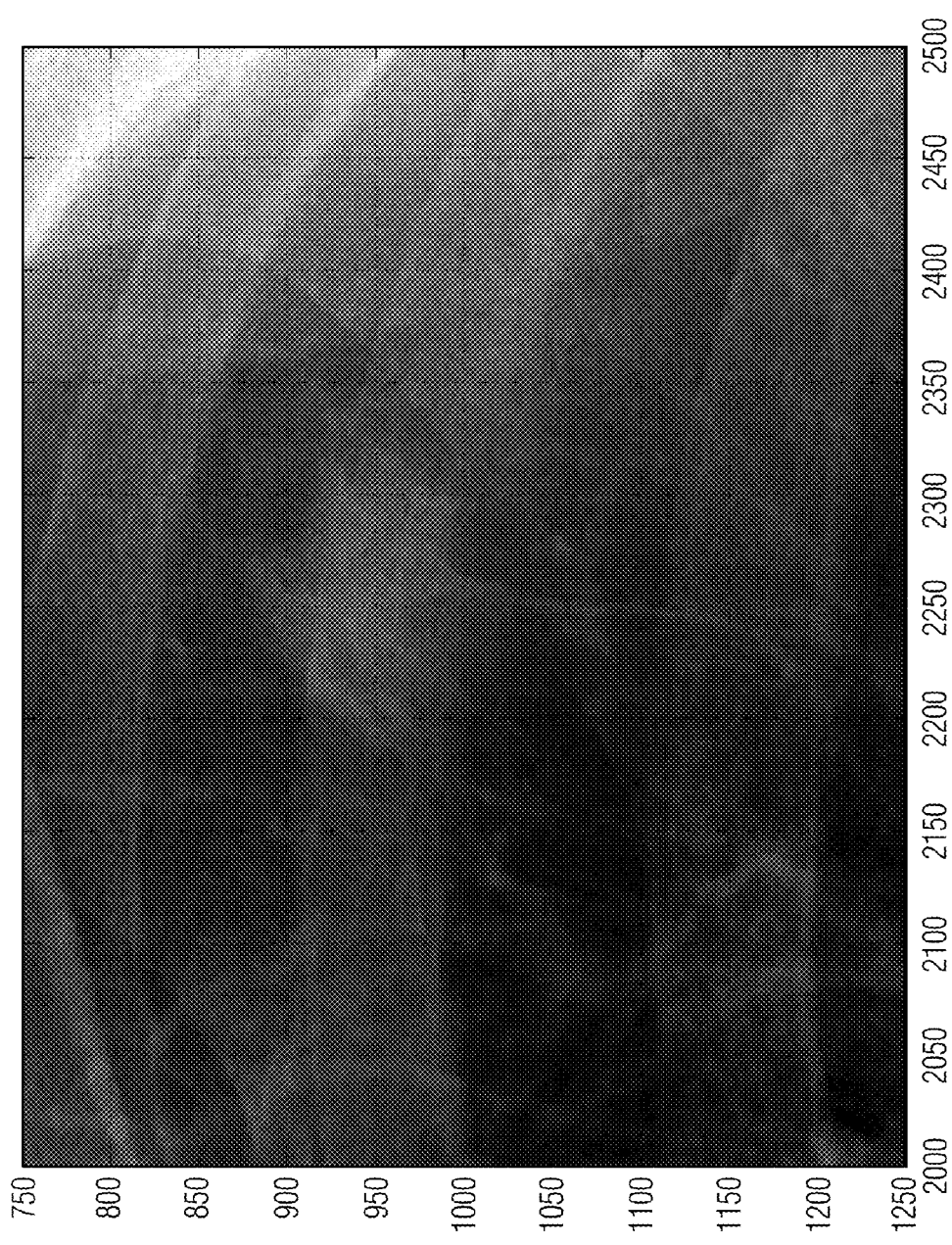

FIG. 11(i) is a close up x-ray radiograph of a lesion partially concealed by ribs selected from the radiographs described above. FIG. 11(ii) shows the same image after applying the above method to suppress the ribs, making the lesion easier to determine. The improved display of the lesion is clearly seen, and it will be appreciated that the above method is not only of value for computer aided diagnosis, but may be useful for manual or semi-manual diagnostic procedures, and is a tool that could be used by medical personnel.

The above method may be incorporated into computer software for running on a general purpose computer such as an IBM compatible PC, a Mac, a Sun workstation or a mainframe. Such a general purpose computer needs little more than a processor, memory, data storage facility, input and output means, a visual display unit (screen) and keyboard or equivalent. Alternatively, algorithms in accordance with the invention may be run on a dedicated terminal, perhaps supplied with x-ray radiography equipment.

It will be appreciated that although the above description relates to rib suppression in anterior posterior x-ray applications, the basic approach is applicable to other chest imaging techniques where ribs obscure the features of interest including dorsal x-ray images of the thoracic cavity. The technique could be useful in NMR and ultrasound imaging of the lungs and to negate the effect of other objects shown in images that obscure the features of interest particularly but not exclusively in medical images.

Non-medical applications include thermal imaging of buildings to find humans concealed within, where it may be necessary to suppress the effect of windows, piers within the walls, and the like. Indeed infra red imaging in general often requires suppression of unwanted background. Other applications include the non-destructive testing of composite materials. Thus embodiments of the present invention are applicable to a wide range of imaging applications where background elements need to be suppressed to enable features of interest to be examined.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A computer-implemented method of removing obscuring features of relatively standard size and shape from an image comprising the obscuring features, features of interest and background, the method performed by the computer comprising:
  b) selecting, by a computer system, Cartesian axes;
  c) applying, by the computer system, a geometric transformation to generate a transformed image with the obscuring features substantially aligned with one of said axes of image;
  d) applying, by the computer system, an attenuation algorithm to the transformed image to suppress features having a dimension in direction of one of said axes of range appropriate to dimension of the distracting features in same direction; and
  e) applying, by the computer system, a reverse geometrical transformation to produce a modified image with distracting features attenuated.

2. The method of claim 1 comprising a preliminary stage (a) of segmenting, by the computer system, a region of interest.

3. The method of claim 1 wherein said image is a medical image of a thoracic cavity and said obscuring features are rib depictions and said features or interest and background are lung tissue and malignancies, wherein step (c) comprises the steps of applying, by the computer system, a geometric transformation to align the rib depictions with a horizontal axis of the medical image; step (d) comprises applying, by the computer system, an attenuation algorithm to suppress the rib depictions; and step (e) comprises applying, by the computer system, a reverse geometrical transformation, thereby generating a modified image wherein the rib depictions are suppressed.

4. The method of claim 3 wherein the image is an x-ray radiograph.

5. The method of claim 3 comprising a preliminary stage (a) of segmenting, by the computer system, contour of lung.

6. The method of claim 3 wherein step (c) of applying, by the computer system, a geometrical transformation comprises a step (c1) of applying, by the computer system, a coarse transformation.

7. The method of claim 6 wherein step (c) further comprises a subsequent step (c2) of applying, by the computer system, a fine transformation.

8. The method of claim 7 wherein step (c1) comprises the following substeps:

c(i) selecting, by the computer system, a section of a first column of a base Image $I_0$ between two contour points;

c(ii) fitting, by the computer system, a polynomial approximation to distance vs. grey level along the column;

c(iii) generating, by the computer system, a difference profile by plotting the difference between the value of the grayscale profile and the value of the polynomial approximation to the grayscale profile for each pixel along the section of the column;

c(iv) smoothing, by the computer system, the difference profile using a smoothing function;

c(v) repeating, by the computer system, steps c(i) to c(iv) to produce a smoothed-difference-profile for a second column of the base Image $I_0$;

c(vi) correlating, by the computer system, the smoothed-difference-profiles of the first and second columns by applying an affine transformation to the smoothed-difference-profile of the second column;

c(vii) repeating, by the computer system, steps c(i) to c(iv) to produce a smoothed-difference-profile for a next column of the base Image $I_0$;

c(viii) correlating, by the computer system, the smoothed difference profiles of the next and previous columns by applying an affine transformation to the smoothed-difference-profile of the next column so as to minimize the correlation-difference between the previous transformed smoothed-difference-profile and the next transformed smoothed-difference-profile; and c(ix) repeating, by the computer system, until an extremity of the lung is reached.

9. The method of claim 8 wherein the section of column in sub-step c(i) is distance between contour points minus a safety margin.

10. The method of claim 9 wherein the safety margin is vertically displaced by 5% from each contour point.

11. The method of claim 8 comprising a limitation selected from the list including:

(I) the polynomial approximation of step c(iii) being a $5^{th}$ order polynomial;

(II) the smoothing function of step c(iv) being a sigmoid transformation;

(III) the affine transformation of step c(vi) comprising applying a linear transformation of type x'→ax+b where a defines a degree of stretch and b defines an offset, thereby minimizing correlation-difference between the first smoothed-difference-profile and the transformed second smoothed-difference-profile;

(IV) the first column is a median x coordinate of a lung and correlation is performed separately towards left and right sides of the lung;

(V) storing cumulative affine transform coefficients for each column for use in inverse geometric transform for converting the attenuated transformed image $I_5$ into a desired final image $I_f$, and (VI) reaching an extremity of a lung is defined as reaching point where column length does not exceed 100 pixels.

12. The method of claim 3 wherein stage (d) of suppressing the ribs comprises the following substeps:

d(i) identifying, by the computer system, short horizontal elements having horizontal dimensions too short to be ribs, and d(ii) discounting, by the computer system, said short horizontal elements to identify suspect ribs by elimination.

13. The method of claim 11 further comprising the step d(iii) of identifying, by the computer system, suspect ribs as ribs by examination of vertical dimensions in transformed image.

14. The method of claim 11 further comprising the substeps of removing, by the computer system, suspected ribs from the second transformed image $I_2$ by plotting the grayscale of each column to form an irregular convex shaped profile, and enveloping the irregular convex shaped profile using a convexity transform.

15. The method of claim 12 wherein the step d(i) of identifying, by the computer system, short horizontal elements comprises:

plotting, by the computer system, grayscale against displacement for each row to generate an irregular convex shaped profile;

applying, by the computer system, a convexity fit to envelope the irregular convex shaped profile with a hull; and producing, by the computer system, a second transformed image $I_2$ by replacing the grayscale profiles of each row of $I_1$ with the associated approximate hull-envelope.

16. The method of claim 15 wherein the step of applying, by the computer system, the convexity fit comprises the following steps:

(A) letting the coordinates of each point profile be (x, g) where x corresponds to horizontal-pixel number and g is grayscale value thereof, (B) taking a first point of the Hull at the point $(x_1, g_1)$;

(C) selecting a second point $(x_2, g_2)$ within the next range of pixels where $[(g_i-g_1)/(x_i-x_1)]$ is lowest, where $x_i-x_1 \neq 0$; and (D) repeating steps alpha and beta for all subsequent points.

17. The method of claim 16 wherein the range is 200 pixels.

18. A computer comprising:

a processor, data input means, at least one data storage memory, random access memory, a user interface comprising user selectable keys and a visual display unit, said computer configured to receive a medical image having Cartesian axes of a body section with bone and/or cartilage depictions that obscures organs and/or soft tissue, wherein the image processing comprises the following steps:

(a) applying a geometric transformation to align the bone depictions with an axis of the medical image;

(b) applying an attenuation algorithm to suppress the bone and/or cartilage depictions; and step (c) applying a reverse geometrical transformation, thereby generating a modified image of the body section wherein the bone and/or cartilage depictions are suppressed.

19. The computer of claim 18 wherein the medical image is selected from the list including: x-ray images of limbs, x-ray images of organs, anterior posterior x-ray images, posterior anterior x-ray images, left lateral x-ray images, right lateral x-ray images, decubitus view x-ray images, lordotic view x-rays, images, expiratory view x-ray images, oblique view x-ray images, NMR images and ultrasound images.

* * * * *